United States Patent

Schustek et al.

[11] Patent Number: 5,853,072
[45] Date of Patent: Dec. 29, 1998

[54] FREE-RUNNING DEVICE FOR STARTING MECHANISM OF INTERNAL COMBUSTION ENGINE

[75] Inventors: Siegfried Schustek, Ditzingen; Manfred Ackermann, Oppenweiler, both of Germany

[73] Assignee: Robert Bosch GmbH, Stuttgart, Germany

[21] Appl. No.: 804,941

[22] Filed: Feb. 24, 1997

[30] Foreign Application Priority Data

Apr. 26, 1996 [DE] Germany ............... 196 16 666.7

[51] Int. Cl.⁶ ........................... F02N 15/02
[52] U.S. Cl. ........................... 192/42; 192/45
[58] Field of Search ............... 192/42, 45; 74/6, 74/7 C

[56] References Cited

U.S. PATENT DOCUMENTS

| | | | |
|---|---|---|---|
| 1,634,738 | 7/1927 | Chryst | 74/6 |
| 2,562,196 | 7/1951 | Lewis | 74/6 |
| 2,939,323 | 6/1960 | Kochendorfer | 74/6 |
| 3,820,406 | 6/1974 | Toulier | 192/42 X |
| 4,178,805 | 12/1979 | Mazzorana | 74/6 |
| 4,187,728 | 2/1980 | Mazzorana | 192/42 X |
| 5,349,877 | 9/1994 | Bonin et al. | 192/42 X |

FOREIGN PATENT DOCUMENTS

| | | | |
|---|---|---|---|
| 2 388 166 | 11/1978 | France . | |
| 2 328 504 | 1/1974 | Germany | 74/6 |
| 31 18 326 | 4/1982 | Germany | 74/7 C |
| 2 028 934 | 3/1980 | United Kingdom | 74/7 C |

OTHER PUBLICATIONS

Patent Abstracts of Japan, vol. 010, No. 295 (M–523), Publication No.: 61109926, Publication Date: May 28, 1986, Inventor: Hagiwara Shigeo.

*Primary Examiner*—Rodney H. Bonck
*Attorney, Agent, or Firm*—Michael J. Striker

[57] ABSTRACT

A free-running device for starting mechanisms of internal combustion engines has a cup-shaped driver having a cup edge and a cup bottom, clamping members through which the cup edge is cooperatable with a hub of the internal combustion engine, the cup edge at least in the region of the clamping members having no mechanical connection to the cup bottom.

9 Claims, 3 Drawing Sheets

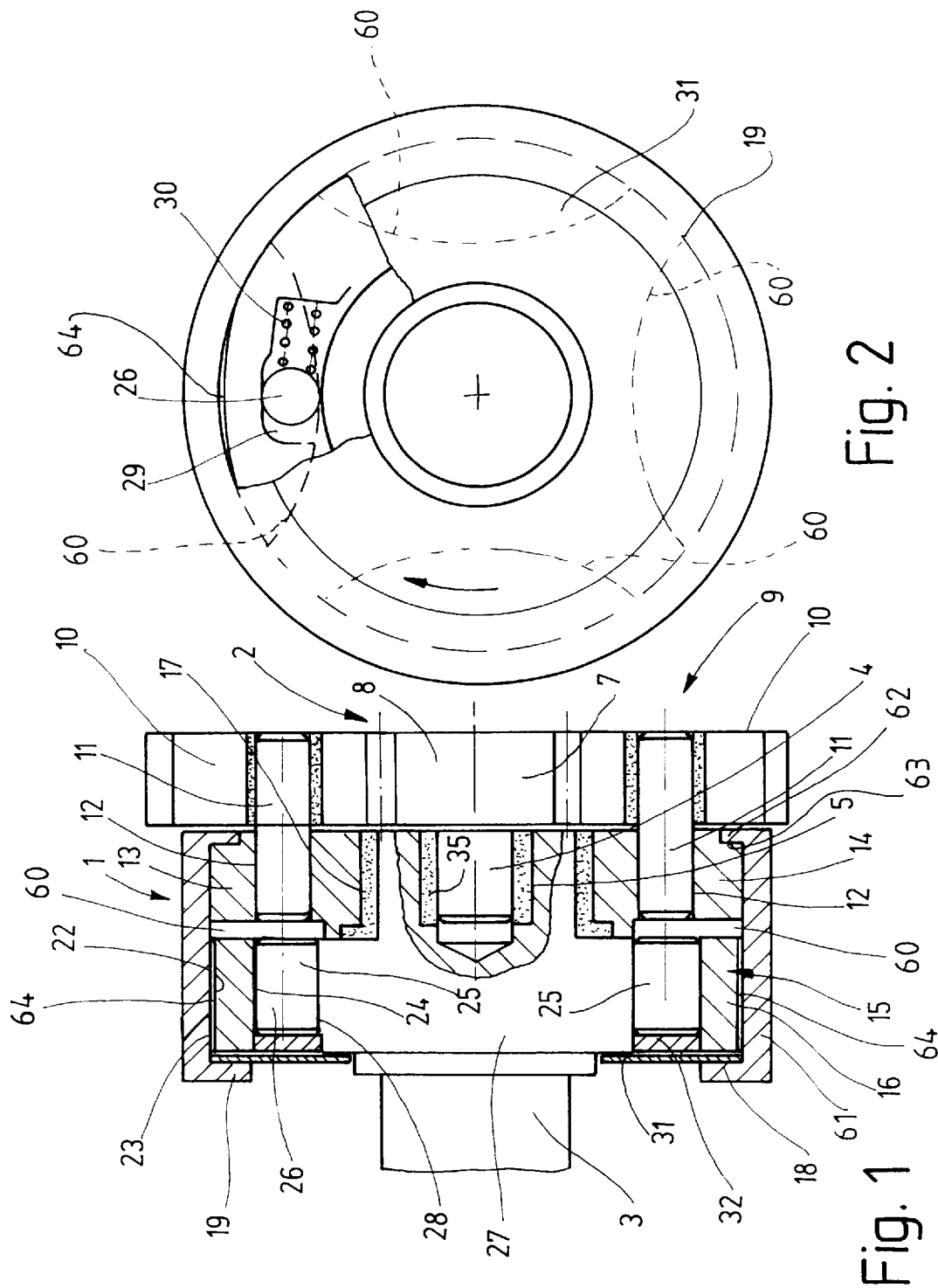

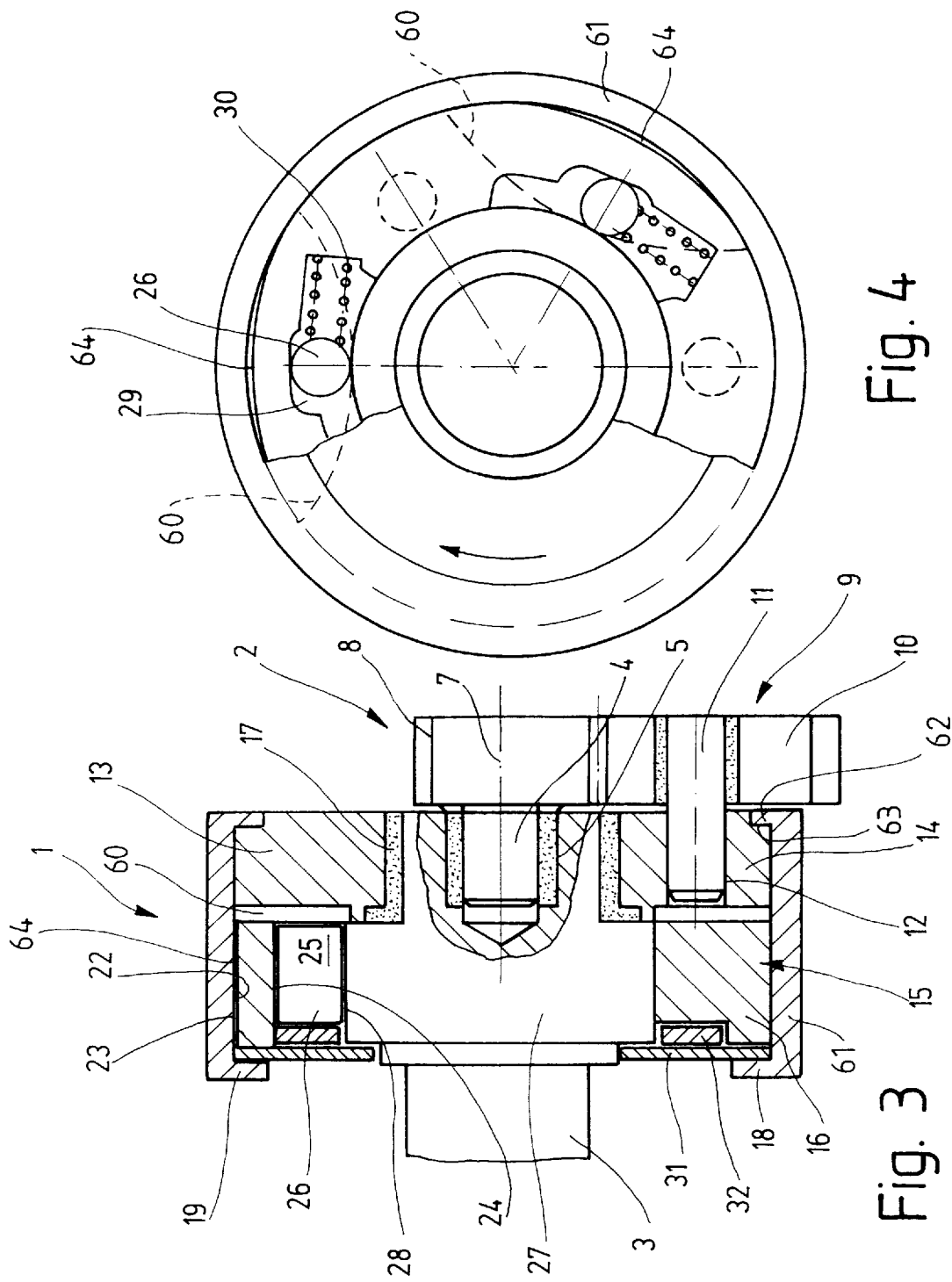

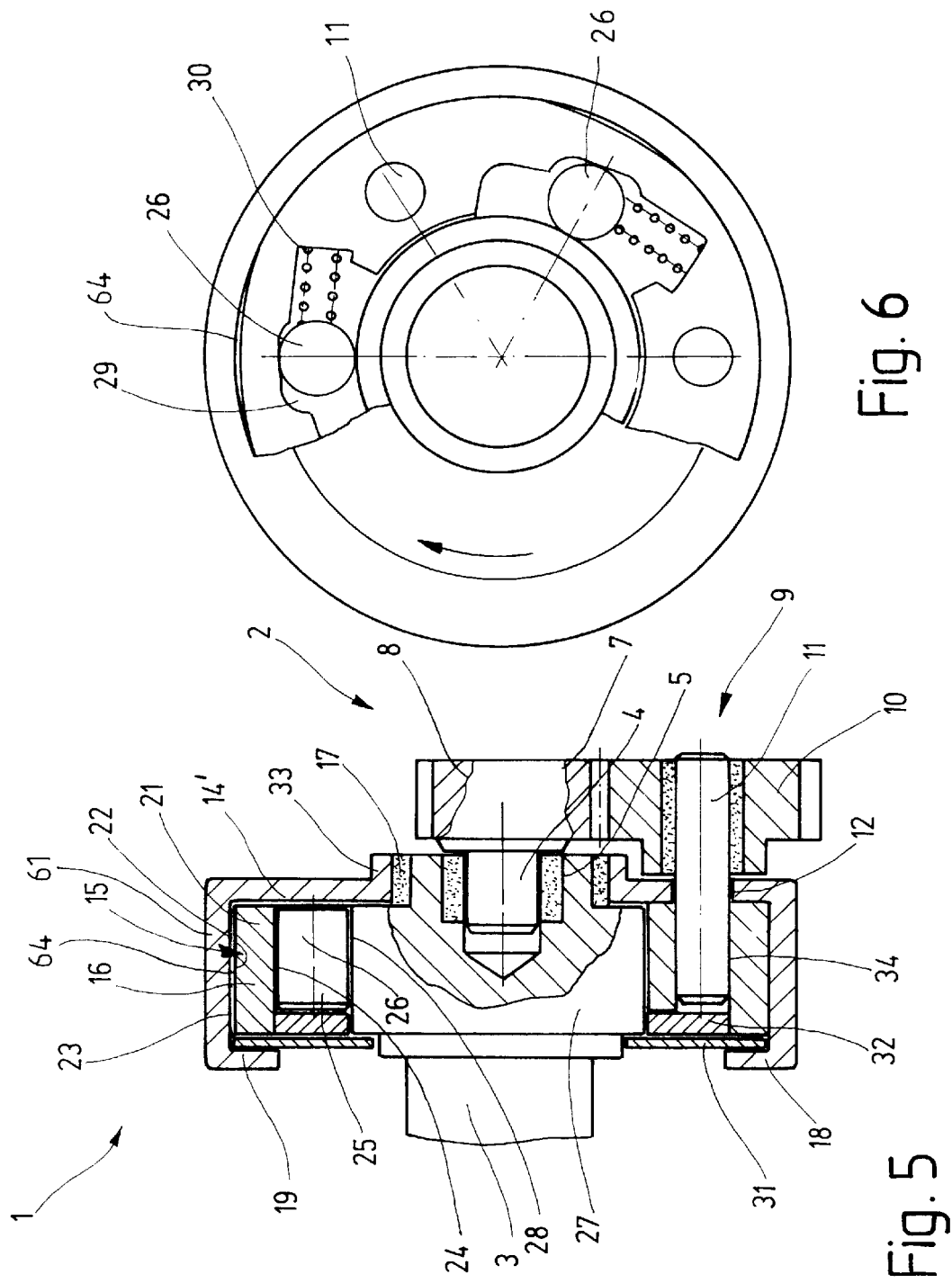

FREE-RUNNING DEVICE FOR STARTING MECHANISM OF INTERNAL COMBUSTION ENGINE

BACKGROUND OF THE INVENTION

The present invention relates to a free-running device for starting mechanisms of internal combustion engines.

Free-running devices of the above mentioned general type are known in the art. They serve for providing a free running between a starter motor of the starting mechanism and a starter pinion, so that during starting of the internal combustion engine an outrun of the starter pinion without an acceleration of the start-on mechanism to impermissible high rotary speeds is possible. The known free-running devices have a cup-shaped driver which is coupled in the region of its cup bottom with an armature shaft of the starting mechanism. The cup edge in a peripheral direction receives clamping members in wedge-shaped pockets. The clamping members cooperate with a hub which carries the pinion and is associated with the internal combustion engine.

The clamping members are biased by springs with a clamping force. Thereby because of the wedge shape of the pockets, it is guaranteed that during a force transmission from the starting mechanism to the pinion a rotary drive is provided and during a force transmission from the pinion to the starting mechanism no drive is provided (disengaging step). Such free running devices in condition of high loads have a tendency to high wear because of expansion by the pressure of the clamping members, since the wall of the cup edge due to its binding to the cup bottom assumes a conical shape and a linear contact between the clamping members formed as clamping rollers and the inner side of the cup-edge wall changes to a more or less great point contact. This leads to excessive surface pressure and correspondingly greater wear. The service life of such free-running device is therefore limited.

SUMMARY OF THE INVENTION

Accordingly, it is an object of the present invention to provide a free-running device for starting mechanisms of internal combustion engines, which avoids the disadvantages of the prior art.

In keeping with these objects and with others which will become apparent hereinafter, one feature of the present invention resides, briefly stated, in a free-running device in which the cup edge at least in the region of the clamping member has no mechanical connection to the cup bottom.

Thereby an uncoupling of both parts is provided. For building a force flux or transmission from the starting mechanism to the pinion, pressure is applied onto the clamping members. The clamping members transfer their pressure to the cup edge which, because of the uncoupling in the region of the clamping members, can be expanded so that this can not lead to a canting of rollers as in the prior art, since no tilting relative to the cup bottom of the driver occurs.

The expression "no mechanical connection to the cup bottom" does not mean that the cup edge and the cup bottom are completely separate parts. Instead, it includes a situation when a mechanical connection is provided, but not in an immediate region of the clamping member, so that the forces applied by the clamping members and deformations caused by them and introduced in the corresponding region in the cup edge, do not have a tendency to inclined positioning because of a binding to the cup bottom.

In accordance with a further embodiment of the invention, it is provided that the cup edge and the cup bottom are of one-piece with one another and the uncoupling is performed by partial cut outs. This partial cutouts are preferably radial cutouts. It is recommended also to provide perpendicular cutouts in the cup body, as well as both radial and perpendicular cut outs in the region of the clamping member. By the partial formation of the cut outs or in other words by forming the cutouts locally, it is guaranteed that the cup edge can expand in radial direction without tilting.

The cup edge and the cup bottom can be formed as two separate parts. Thereby automatically an uncoupling of the cup edge from the cup bottom in the region of the clamping member is provided.

In accordance with a further embodiment of the invention, the cup edge is surrounded by a ring wall which is connected with the cup bottom or is formed of one-piece of the cup bottom, and in the region of the clamping member a free space between the cup edge and the ring wall is formed. When the cup edge is completely surrounded by a ring wall, the free space between the cup edge and the ring wall guarantees that the cup edge in the region of the clamping member can expand without contacting the ring wall. In other words, the ring wall holds under load the desired cylindrical shape and no above mentioned tilting of the clamping member occurs. In the regions outside the regions of the clamping member, the ring wall abuts preferably against the cup edge.

The free space in accordance with present invention can preferably have a sickle-shaped contour. It is advantageous when the free space is formed by a partial flattening of the outer surface of the cup edge or by a partial expansion of the ring wall.

In accordance with a further embodiment of the invention, an armature shaft of the starting mechanism is supported in a bearing of the cup bottom or the hub. The armature shaft can preferably hold a sun gear of a planetary transmission, while its planetary carrier is supported on axial pins of the driver.

In accordance with a further embodiment of the present invention, the clamping members can be formed as clamping rollers with preferably circular cross-sections.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a longitudinal section of a free-running device in accordance with the first embodiment of the invention;

FIG. 2 is an end view of the free-running device of FIG. 1, partially sectioned;

FIG. 3 is a view showing a longitudinal section of a further embodiment of a free-running device in accordance with present invention;

FIG. 4 is an end view of the free-running device in FIG. 3, partially in sections;

FIG. 5 is a view showing a further embodiment of a free-running device in a longitudinal section; and FIG. 6 is an end view of the free-running device in accordance with the embodiment of FIG. 5, partially sectioned.

DESCRIPTION OF PREFERRED EMBODIMENTS

FIG. 1 shows a free-running device which is identified as a whole with reference numeral 1. The free-running device is arranged between an armature shaft 2 of a not shown starting mechanism and a driven shaft received in a not shown single-track pinion cooperating with a not shown internal combustion engine during the operation of the starting device for starting the internal combustion engine. When the start is performed, the rotary speed of the single-track pinion can be greater than the rotary speed of the armature shaft 2, so that then the free-running device 1 is operated and an uncoupling of the parts occurs.

The armature shaft 2 has an axial projection 4 which is supported in a bearing opening 5 of a hub 27. The armature shaft 2 carries a toothed gear 7 which forms a sun gear 8 of a planetary transmission 9. Planetary carriers 10 which are parts of the planetary transmission 9 and engage with the sun gear 8 are supported on axial pins 11. The axial pins 11 are held in receiving openings 12 of a driver member 13. The driver member 13 forms a cup bottom 14 of a cup-shaped driver 15. The driver 15 has a cup edge 16 which extends from the cup bottom 14. The cup bottom 14 and the cup edge 16 are formed of one-piece with one another.

Cutouts 60 are provided between the cup bottom 14 and the cup edge 16 as shown in FIG. 1 and identified with broken lines in FIG. 2. It can be seen from FIG. 2 that four such cutouts 60 are provided. Each cutout 6 extends in a radial direction in a transition region between the cup edge 16 and the cub bottom 14 and is located in the region of one of the four clamping members 25. As can be seen from FIG. 2, the associated clamping member 25 is located in the surface which is formed by the respective cutout 60. The cutouts 60 are formed partially, or in other words locally in the driver 15 and have a concavely extending arcuate contour. In the remaining regions, the cup bottom is formed of one piece with the cup edge. The contour of the cutout 60 corresponds to the respective tool which is used in the manufacturing processes, for example a slot mill.

FIG. 1 shows a ring wall 61 which has a cross-section with a C-contour. The end region 18 of the ring wall 61 forms a radially inwardly oriented collar 19. Prior to mounting, the ring wall 61 has a cross-section with an L-shaped, so that the corresponding components can be introduced. When this is performed, the C-shape is formed by flanging and the end region 62 is pressed into a recess 3 of the cup bottom 14. The collar 19 coats a cover disk 31 extending from the ring wall 61 in direction toward the driven shaft 3 and respectively the hub 27. Therefore, it covers the cup edge 16 and also the clamping member 25 and positioned in this manner.

FIG. 2 illustrates a free space 64 formed in the region of each clamping member 25 between the cup edge 16 and the ring wall 61. FIG. 2 shows only one clamping member 25, while in this embodiment four clamping members are arranged at an angular distance of 90° from one another. This means that also four free spaces 64 are provided between the cup edge 16 and the ring wall 61. The free space 64 has preferably a sickle-shaped contour. This contour is produced so that either the outer casing 22 of the cup edge 16 is partially flattened and/or the inner casing surface 23 of the ring wall 61 is partially deformed and/or the ring wall 61 is partially expanded. FIG. 1 shows that the free space 64 extends over the total height of the cup edge 16.

The inner casing wall 24 of the cup edge 16 cooperates with the clamping member 25 which is formed as cylindrical clamping rollers 26. The longitudinal central axes of the clamping rollers 26 extend parallel to the rotary axis of the armature shaft 2. The central axes of the axial pins 11 extend also parallel to the central axes of the armature shaft 2. In the embodiment shown in FIGS. 1 and 2, the axial pins 11 and the clamping rollers 26 are arranged substantially on the same central axes. A hub 27 is arranged between the clamping rollers 26 and has a cylindrical casing wall 28. The hub 27 is fixedly connected with the single-track pinion for joint rotation with it. Preferably, a cage member 32 for the clamping rollers 26 is located between the cover disk 21 and the clamping rollers 26. As shown in FIG. 2, wedge-shaped receiving pockets 29 for the clamping rollers 26 are formed in the cup wall 16. The clamping rollers 26 together with spiral pressure springs 30 are loaded substantially tangentially to the rotary axis of the armature shaft 2.

In the embodiments of FIGS. 1–6 the hub 27 of the free-running device 1 is formed at an end of the driven shaft 3 of one-piece with it. A not shown single track pinion is axially engageable with the drive shaft 3 in a known manner through a steep thread by an engaging magnet of the starting device in an axial direction.

The device in accordance with the present invention operates in the following manner:

When in a coupling condition of the free-running device 1 the armature shaft 2 drives the driver 15 through the planetary transmission 9, the due to the produced forces the clamping rollers 26 are pressed into the narrowing receiving pockets 29, and thereby they apply a radial force to the cup edge 16 and a force transmission path is formed. The cup edge 16 can have elastically plane-parallel expansion in direction toward the inner casing surface 23 of the ring wall 61. Since the free space 64 is provided between the cup edge 16 and the ring wall 61 in the corresponding region of the clamping rollers 26, the cup edge 16 can possibly expand without contacting the ring wall 61 in this region. Since because of the cutouts 60 in the corresponding region of the clamping members 25, no direct mechanical connection from the cup bottom 14 is available, and inclined position of the cup edge 16 is prevented. In all loading conditions, the ring wall 26 maintains the desired cylindrical shape. This unhindered expansion of the cup edge 16 provides an optimal force introduction and force transmission without a conical expansion of the cup-shaped driver 15. Therefore, a linear force loading of the clamping rollers 26 can be maintained also under extreme operational conditions of the free-running device.

The free-running device of the embodiment of FIGS. 3 and 4 is formed substantially similar to the free-running device of FIGS. 1 and 2. Therefore, only the differences of this device will be explained hereinbelow. These differences include the feature that while in the embodiment of FIGS. 1 and 2 four clamping rollers 26 are provided when seen in the peripheral direction, in the embodiment of FIGS. 3 and 4 only three clamping rollers 26 and also only three axial pins 11 spaced from one another by an angular distance of 120°. The axial pins 11 and the clamping rollers 25 are offset relative to one another by 45° as can be seen in FIG. 4. In this embodiment the three clamping rollers are associated with the corresponding cutout 60, as described with respect to FIGS. 1 and 2. Also, the free space 64 is arranged in the region of the clamping rollers 26. The operation of the embodiment of FIGS. 3 and 4 is similar to the operation of the embodiments of FIGS. 1 and 2 as described hereinabove.

In the embodiment of FIGS. 5 and 6, the same reference numerals as in the embodiment of FIGS. 1 and 2 are utilized. Therefore the description of FIGS. 1 and 2 is applicable to the description of this embodiment as well. Only differences from this embodiment will be described hereinbelow.

FIG. 5 shows that the cup edge 16 and the cup bottom 14' are formed as two separate parts. In FIG. 5 the ring wall 61 is formed of one-piece with the cup bottom 14'. A bearing projection 33 is provided perpendicular to the cup bottom 14' and associated with the bearing 17 of the hub 27.

The axial pins 11 are arranged angularly offset relative to the clamping rollers 26 as shown in FIG. 6. The axial pins 11, as the clamping rollers 26, can extend in the cup edge 16 and engage in the receiving openings 34. They further engage the receiving openings 12 of the cup bottom 14'. Thereby a substantially shorter axial construction of the free-running device is provided.

Because of the two-part construction of the cup edge 16 and the cup bottom 14, no cutout is provided in the embodiment of FIG. 5 since here automatically an uncoupling of the cup bottom 14' from the cup edge 16 is provided. This uncoupling acts similarly to the cutout 60 in FIGS. 1–4. Simultaneously the free space 64 is provided in the region of the clamping roller 26.

In the shown embodiments the hub 27 of the free-running coupling is formed of one piece at the end of a drive shaft, on which the not shown single-trak pinion is axially engaged in a known manner through a steep thread of the driven shaft by means of an engaging magnet of the starting mechanism.

It will be understood that each of the elements described above, or two or more together, may also find a useful application in other types of constructions differing from the types described above.

While the invention has been illustrated and described as embodied in free-running device for turn-on mechanism of internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A free-running device for starting mechanisms of internal combustion engines, comprising a cup-shaped driver having a cup edge and a cup bottom; clamping members through which said cup edge is cooperatable with a hub associated with the internal combustion engine; a ring wall which surrounds said cup edge and is connected with said cup bottom, said cup edge at least in the region of said clamping members having partial gaps so that no mechanical connection is provided between said cup edge and said cup bottom as well as between said cup edge and said surrounding ring wall.

2. A free-running device as defined in claim 1, wherein said cup edge and said cup bottom are formed as two separate elements.

3. A free-running device as defined in claim 1, wherein said ring wall is formed of one-piece with said cup bottom.

4. A free-running device as defined in claim 1, wherein said free space has a substantially sickle-shaped contour.

5. A free-running device as defined in claim 1, wherein said free-space is formed by a partial flattening of an outer surface of said cup edge.

6. A free-running device as defined in claim 1, wherein said free-space is formed by a partial expansion of said ring wall.

7. A free-running device as defined in claim 1, wherein said cup bottom has a bearing for receiving an armature shaft of the starting mechanism.

8. A free-running device as defined in claim 1, wherein said cup bottom has a hub for receiving an armature shaft of the starting mechanism.

9. A free-running device as defined in claim 1, wherein said clamping members are formed as clamping rollers having a circular cross-section.

* * * * *